United States Patent [19]

Mory et al.

[11] 4,046,755
[45] Sept. 6, 1977

[54] DISAZO PIGMENTS CONTAINING NAPHTHALENE COUPLING COMPONENTS

[75] Inventors: Rudolf Mory, Dornach; Rolf Müller, Aesch, both of Switzerland

[73] Assignee: Ciba-Geigy Corporation, Ardsley, N.Y.

[21] Appl. No.: 604,525

[22] Filed: Aug. 14, 1975

Related U.S. Application Data

[63] Continuation-in-part of Ser. No. 314,282, Dec. 12, 1972, abandoned.

[30] Foreign Application Priority Data

Dec. 31, 1971    Switzerland .................. 18188/71

[51] Int. Cl.² .................. C09B 43/12; C09B 33/14
[52] U.S. Cl. .................. 260/174; 260/184; 260/195; 260/202; 260/208
[58] Field of Search .................. 260/174, 177, 184, 187, 260/188

[56] References Cited

U.S. PATENT DOCUMENTS

| | | | |
|---|---|---|---|
| 3,262,925 | 7/1966 | Mueller et al. | 260/184 X |
| 3,658,785 | 4/1972 | Ronco et al. | 260/184 |

FOREIGN PATENT DOCUMENTS

| | | | |
|---|---|---|---|
| 1,903,649 | 10/1969 | Germany | 260/188 |
| 1,037,988 | 8/1966 | United Kingdom | 260/184 |

*Primary Examiner*—Charles F. Warren
*Attorney, Agent, or Firm*—Vincent J. Cavalieri

[57] ABSTRACT

Disazo pigments of the formula

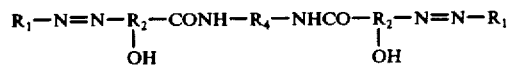

wherein $R_1$ is 2-nitro-5-chlorophenyl or 1-nitronaphthyl-2, $R_2$ is naphthalene in which the azo, hydroxyl and —CO—group are in the 1,2,3-position and $R_4$ is a phenylene or naphthalene group are prepared. The disazo pigments may be used for pigmenting high molecular organic materials such as cellulose ethers, polyamides, polyurethanes and acrylic. The pigments have very good fastness to migration, heat and to light.

1 Claim, No Drawings

DISAZO PIGMENTS CONTAINING NAPHTHALENE COUPLING COMPONENTS

This is a continuation-in-part of application Ser. No. 314,282 filed on Dec. 12, 1972 now abandoned.

It has been found that new valuable disazo pigments of the formula

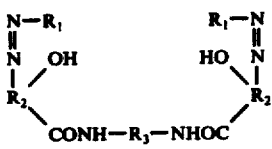

I wherein $R_1$ denotes a 2-nitro-5-chlorophenyl or 1-nitronaphthyl-2 radical, $R_2$ denotes a naphthalene radical in which the azo, hydroxyl and —CO— group are in the 1,2,3-position and $R_3$ denotes a phenylene or naphthylene radical, are obtained if a) a carboxylic acid halide of the formula

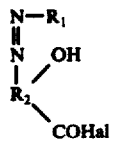

II is condensed with an arylenediamine in the molar ratio of 2:1, or b) a diazo or diazoamino compound of an amine of the formula

III is coupled with a 2,3-hydroxynaphthoic acid arylide of the formula

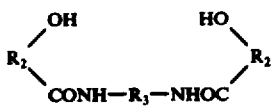

IV in the molar ratio of 2:1.

Since the dyestuffs according to the invention are pigments, groups which confer solubility in water, especially acid groups which confer solubility in water, such as sulphonic acid groups or carboxylic acid groups, must of course be excluded.

Particular interest attaches to disazo pigments of the formula

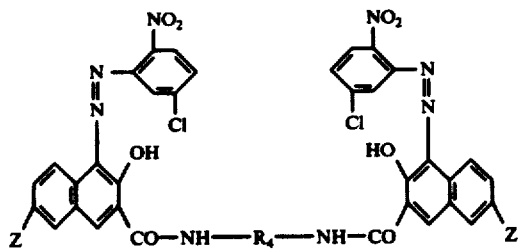

V wherein $R_4$ denotes a 1,4-phenylene or 1,5-naphthylene radical and Z denotes a hydrogen or halogen atom, a lower alkoxy group, that is to say an alkoxy group with 1 to 4 carbon atoms, a nitro group or a nitrile group, or disazo pigments of the formula

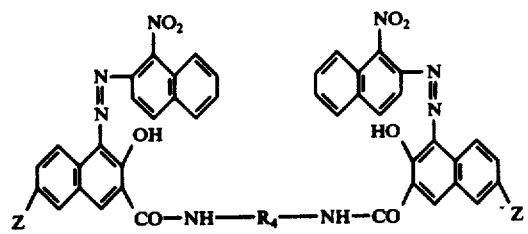

VI wherein Z and $R_4$ have the indicated meaning.

In the formulae indicated, $R_4$ preferably represents a radical of the formula

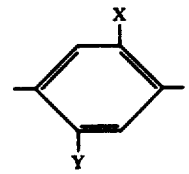

VII wherein X and Y denote hydrogen or halogen atoms, nitrile groups or lower alkyl, alkoxy, alkylsulphonyl or alkoxycarbonyl groups, that is to say groups of this type with 1 to 4 carbon atoms.

The azo dyestuff-carboxylic acids on which the acid halides to be used according to the invention are based are obtained by coupling the corresponding amines with a 2,3-hydroxynaphthoic acid, especially a 2,3-hydroxynaphthoic acid of the formula

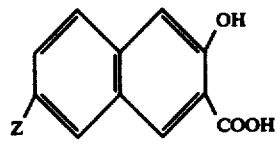

VIII wherein Z has the indicated meaning.

The azo dyestuff-carboxylic acids thus obtained are treated with agents which are capable of converting carboxylic acids into their halides, for example into the chlorides or bromides, such as, in particular, with phosphorus halides, such as phosphorus pentachloride or phosphorus trichloride or phosphorus pentabromide, phosphorus oxyhalides and preferably with thionyl chloride.

The treatment with such acid-halogenating agents is appropriately carried out in inert organic solvents, such as dimethylformamide, chlorobenzenes, for example monochlorobenzene or dichlorobenzene, toluene, xylene or nitrobenzene, optionally with the addition of dimethylformamide in the 5 last-mentioned cases.

When manufacturing the carboxylic acid halides it is as a rule desirable first to dry the azo compounds manufactured in an aqueous medium, or to free them of water azeotropically by boiling in an organic solvent. If desired, the azeotropic drying can be carried out immediately before the treatment with the acid-halogenating agents.

According to the present process, the monocarboxylic acid halides thus obtainable are condensed with arylenediamines, preferably with phenylenediamines or 1,5-diaminonaphthalenes in the molar ratio of 2:1. Preferably, 1,4-diaminobenzenes of the formula

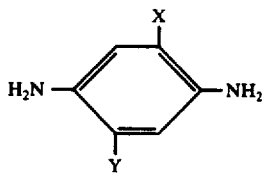   IX are used, wherein X and Y denote hydrogen or halogen atoms or lower alkyl, alkoxy or methylsulphonyl groups.

The following diamines may be mentioned as examples:

1,4-diaminobenzene, 1,4-diamino-2-chlorobenzene, 1,4-diamino-2-bromobenzene, 1,4-diamino-2,5-dichlorobenzene, 1,4-diamino-2-methylbenzene, 1,4-diamino-2,5-dimethylbenzene, 1,4-diamino-2-methoxybenzene, 1,4-diamino-2,5-dimethoxybenzene, 1,4-diamino-2,5-diethoxybenzene, 1,4-diaminobenzene-2,5-dicarboxylic acid dimethyl ester, 2-cyano-1,4-phenylenediamine, 2-trifluoromethyl-1,4-phenylenediamine, 2-chloro-5-methyl-1,4-phenylenediamine, 2-chloro-5-methoxy-1,4-phenylenediamine, 2-methyl-5l-methoxy-1,4-phenylenediamine, 2-methylsulphonyl-1,4-phenylenediamine, 1,3-diaminobenzene, 2-methyl-1,3-diaminobenzene, 4,6-dichloro-1,3-diaminobenzene and 1,5-diaminonaphthalene.

The condensation between the carboxylic acid halides of the initially mentioned type and the amines is appropriately carried out in an anhydrous medium. Under this condition it in general takes place surprisingly easily already at temperatures which lie in the boiling range of normal organic solvents, such as toluene, monochlorobenzene, dichlorobenzene, trichlorobenzene, nitrobenzene and the like. To accelerate the reaction it is in general advisable to use an acid-binding agent, such as anhydrous sodium acetate or pyridine. The dyestuffs obtained are in part crystalline and in part amorphous and are in most cases obtained in very good yield and in a pure state. It is desirable first to isolate the acid chlorides obtained from the carboxylic acids. In some cases it is however possible, without detriment, to dispense with isolating the acid chlorides and to carry out the condensation immediately following the manufacture of the carboxylic acid chlorides.

According to embodiment b) of the process according to the invention, the new dyestuffs are obtained if a diazo or diazoamino compound of an amine of the formula

   X wherein $R_1$ has the initially mentioned meaning, is coupled with a 2,3-hydroxynaphthoic acid arylide of the formula

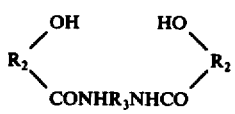   XI in the molar ratio of 2:1.

The 2,3-hydroxynaphthoic acid arylides required for this purpose can be manufactured according to a method which is in itself known from a 2,3-hydroxynaphthoic acid, which is optionally substituted in the 6-position, and an arylenediamine in an anhydrous medium, such as toluene, xylene, chlorobenzene and the like, under the influence of a condensation agent, such as phosphorus trichloride.

The coupling advantageously takes place by gradual addition of the aqueous-alkaline solution of the coupling component to the acid solution of the diazonium salt. The amount of alkali hydroxide to be used for dissolving the coupling component is appropriately so chosen that it suffices for neutralisation of the mineral acid liberated from the diazonium salt during coupling. The coupling is appropriately carried out at a pH—value of 4 to 6. The pH—value is appropriately adjusted by adding a buffer. Possible buffers are, for example, the salts, especially the alkali salts, of formic acid, phosphoric acid or especially of acetic acid. The alkaline solution of the coupling component appropriately contains a wetting agent, dispersing agent or emulsifier, for example an aralkylsulphonate, such as dodecylbenzenesulphonate, or the sodium salt of 1,1'-naphthylmethanesulphonic acid, polycondensation products of alkylene oxides, such as the reaction product of ethylene oxide with p-tert.-octylphenol, and also alkyl esters of sulphoricinoleates, for example n-butylsulphoricinoleate. The dispersion of the coupling component can also advantageously contain protective colloids, for example methylcellulose or minor amounts of inert organic solvents which are sparingly soluble or insoluble in water, for example optionally halogenated or nitrated aromatic hydrocarbons, such as benzene, toluene, xylene, chlorobenzene, dichlorobenzenes or nitrobenzene, and also aliphatic halogenated hydrocarbons, such as, for example, carbon tetrachloride or trichloroethylene,, as well as water-miscible organic solvents, such as acetone, ethylene glycol monomethyl ether, methyl ethyl ketone, methanol, ethanol, isopropanol or dimethylformamide.

The coupling can also advantageously be carried out by continuously combining an acid solution of the diazonium salt with an alkaline solution of the coupling component in a mixing nozzle, whereupon immediate coupling of the components takes place. It is necessary to ensure that the diazo component and coupling component are present in equimolecular amounts in the mixing nozzle, with a slight excess of coupling component proving advantageous. This is most simply achieved by controlling the pH—value of the liquid in the mixing nozzle. It is also necessary to ensure vigorous intermixing of the two solutions in the mixing nozzle. The resulting dyestuff dispersion is continuously withdrawn from the mixing nozzle and the dyestuff is isolated by filtration.

The coupling can also be carried out by heating a diazoamino compound of the amine of the formula

   XII wherein $R_1$ has the initially mentioned meaning, together with the coupling component in an organic solvent, if appropriate in an aqueous organic solvent, preferably in the presence of an acid.

The aryldiazoamino compounds to be used according to the process are obtained according to a known process by condensation of an aryldiazonium salt with a primary or preferably with a secondary amine. The most diverse amines are suitable for this purpose, for example aliphatic amines, such as methylamine, ethylamine, ethanolamine, propylamine, butylamine, hexylamine and especially dimethylamine, diethylamine, diethanolamine, methylethanolamine, dipropylamine or dibutylamine, aminoacetic acid, methylaminoacetic acid, butylaminoacetic acid, aminoethanesulphonicacid, methylaminoethanesulphonic acid, guanylethanesulphonic acid, β-aminoethylsulphuric acid, alicyclic amines such as cyclohexylamine, N-methylcyclohexylamine and dicyclohexylamine, aromatic amines such as 4-aminobenzoic acid, sulphanilic acid, 4-sulpho-2-aminobenzoic acid, (4-sulphophenyl)-guanidine, 4-N-methylaminobenzoic acid, 4-ethylaminobenzoic acid, 1-aminonaphthalene-4-sulphonic acid, 1-aminonaphthalene-2,4-disulphonic acid, heterocyclic amines such as piperidine, morpholine, pyrrolidine and dihydroindole, and finally also sodium cyanamide or dicyandiamide.

As a rule, the diazoamino compounds obtained are sparingly soluble in cold water and can be isolated from the reaction medium in a crystalline form, if appropriate after salting-out. In many cases the most press cakes can be used for the further reaction. In some cases it may prove advisable to dehydrate the diazoamino compounds prior to the reaction by vacuum drying or, after suspending the moist press cake in a solvent, to remove the water by azeotropic distillation.

The coupling of the diazoamino compound with the naphthol is carried out in an organic solvent, for example chlorobenzene, o-dichlorobenzene, nitrobenzene, pyridine, ethylene glycol, ethylene glycol monomethyl ether or monoethyl ether, dimethylformamide, formic acid or acetic acid. When using solvents which are water-miscible it is not necessary to use the diazoamino compounds in the anhydrous form. For example, the filter cakes moist with water can be used. The splitting of the diazoamino compound which precedes the coupling takes place in an acid medium. If neutral solvents are used, the addition of an acid, for example hydrogen chloride, sulphuric acid, formic acid or acetic acid, is necessary.

The coupling is appropriately carried out warm, preferably at temperatures of between 80° and 180° C, and in general takes place very rapidly and completely.

Finally, the coupling can also be carried out by suspending the amine to be diazotised together with the coupling component in the molar ratio of 2:1 in an organic solvent and treating it with a diazotising agent, especially an ester of nitrous acid, such as methyl nitrite, ethyl nitrite, butyl nitrite, amyl nitrite or octyl nitrite.

It has been found that the pigments of this invention are eminently suitable for coloring high molecular organic materials in the mass.

The pigments are preferably used in the finely divided form. The grinding of the pigment may be done in the dry or wet condition, advantageously in the presence of an organic water-soluble or water-insoluble solvent, or by kneading or grinding the crude pigment in the presence of a solid assistant, for example, a salt capable of being removed by washing.

In many cases it is of advantage, in order to convert the pigment into a finely divided form, to grind the crude pigment with the substratum to be colored or with a component of the substratum.

As high molecular materials that may be colored by the process of the invention there may be mentioned for example natural high molecular products, such as abietic acid, rubber, casein or cellulose or cellulose derivatives such as nitrocellulose, cellulose acetate, cellulose propionate, cellulose acetopropionate, cellulose acetobutyrate or carboxymethyl cellulose, and especially synthetic high molecular products, for example polymerization resins, such as vinyl polymers which are obtained by polymerizing ethylene or a monovinyl compound that is a compound which is derived from ethylene by substitution of one or both hydrogen atoms on one of the two carbon atoms of the ethylene for example by halogen atoms, alkyl, phenyl or cyano groups. As examples may be mentioned polyolefines, such as polyethylene, polypropylene, polyisobutylene, polybutadiene, polyisoprene, polystyrene or polyvinylhalides, such as polyvinylchloride or poly-(1,2-dichlorethylene) or polyvinylcyanides such as polyacrylonitrile, poly-(1,2-dicyanethylene) polymethacrylonitrile, polymethacrylic acid ester, furthermore polyacrylic acid esters, polyvinylacetate and polyvinylacetal. Instead of the homopolymers, also the copolymers of different monovinyl compounds must be mentioned, for example the copolymers of vinylchloride with vinylacetate or of vinylchloride with 1,2-dichlorethylene or of acrylonitrile with 1,2-dicyanethylene or of butadiene with styrene. Here also the polymerization products of natural unsaturated compounds such as linseed oil must be mentioned.

The pigments to used according to the present invention are also highly suitable in the manufacture of colored condensation resins especially aminoplasts which are obtained by reacting urea or a compound of urea like character, such as thiourea, guanidine, acetylene diurea, dicyandiamide or uron. As further compounds with urea-like character the aminotriazines, especially melamine or guanamines, such as aceto-, benzo- or formoguanamine must be mentioned. The pigments are advantageously incorporated into the low molecular condensation products of above mentioned amino compounds with formaldehyde, for example di-, tri- or tetramethylol urea, tri- or hexamethylol melamine. In place of the free methylol compounds also their ethers with low molecular aliphatic alcohols, such as methanol or butanol may be used. The pigments are equally useful for the manufacture of colored molded articles or colored lacquers that contain one or several of the above aminoplasts in an organic solvent or colored aqueous emulsions containing the above precondensates, if necessary in the presence of organic solvents for example an oil-in-water emulsion or a water-in-oil emulsion. Such emulsions are especially suitable for impregnating or printing textiles or other sheet-like structures, such as paper or leather or fabrics made of glass fibers with subsequent heat treatment. Another important type of polycondensation resins to which the compounds of the invention can be applied are the polyester resins, which are obtained when an unsaturated polyester is reacted with an unsaturated polymerizable compound such as cyclopentadiene, cyclohexene, vinyl acetate, methyl methacrylate or especially styrene. The unsaturated polyesters are obtained by the polycondensation of an unsaturated polycarboxylic acid, such as maleic acid, fumaric acid, itaconic acid or their anhydrides with a polyhydric alcohol, such as ethylene glycol or polyethylene glycols. As further types of polycondensation resins there must be mentioned the linear polyesters which are obtained by the polycondensation of an aromatic dicarboxylic acid, especially terephthalic acid with an aliphatic diol, especially glycol, or the linear polyamides, which are obtained by the polycondensation of an aliphatic dicarboxylic acid with an aliphatic diamine or by the condensation of an ω-amino-fatty acid, especially ε-caprolactam or ω-aminoundecanoic acid. Both the linear polyamides and polyesters are primarily used for making fibers. For this purpose the pigments are dispersed in the melt of the polycondensates, and the pigmented melt is extruded to form fibers. Finally, also the polycarbonates must be mentioned which are obtained by the polycondensation of a dihydroxy compound for example 4,4-dihydroxy-2,2-propane with phosgene.

With the same success the pigments of this invention can also be used for the manufacture of colored polyaddition resins for example polyurethane resins which are obtained by the polyaddition of a polyhydric alcohol, with a polyisocynate; as polyols there come into consideration, for example ethylene glycol, 1,3- or 1,4-butylene glycol, trimethylolpropane, hexantriol-1,2,6, diethylene glycol or a hydroxy group containing high molecular polyether or polyester, especially a polyester from dicarboxylic acids, such as adipic acid, maleic acid, or phthalic acid with one of the above mentioned glycols. As polyisocyanates especially the arylene diisocyanates, such as naphthylene-1,5-diisocyanate, diphenylmethane-diisocyanate, phenylene-1,4-diisocyanate, 1-methyl-phenylene-2,4-diisocyanate, or m- or p-xylylenediisocyanate must be mentioned. There may be formed coatings, molded articles or foams on the basis of colored polyurethanes. Also a very important class of polyaddition resins are the epoxy resins which are obtained by polyaddition of a condensate which is obtained by condensing in an alkaline medium epichlorohydrin or dichlorohydrin and one or more polyhydric alcohols or phenols, for example resorcin, hydroquinone, 4,4'-dihydroxybenzophenone, bis-(4-hydroxyphenyl)-1,1-ethane, bis-(4-hydroxyphenyl)-1,1-isobutane or bis-(4-hydroxyphenyl)-2,2-butane,bis-(4-hydroxyphenyl-1,1-cyclohexane or especially bis-(4-hydroxyphenyl)-2,2-propane. When these condensates are colored with the pigments of this invention and cured in the presence of catalysts, such as amines, very stable colored resins are obtained.

Since the pigments are insoluble in all organic solvents and heat resistant to a high degree they are equally suitable for coloring lacquers, paints, printing inks or spinnable masses dissolved in solvents or molten spinnable masses.

The pigments are, when synthesized, in a physically useful form, and is advantageously finely dispersed before application, for example by being ground in a dry or moist aqueous state with or without the addition of an organic solvent and/or a salt which can be washed out.

The pigments can be used either in the pure form as a so-called toner or in the form of preparations in which the pigments are present in a finely divided state. Such preparations, which may contain the usual additions, for example, dispersing agents or binders, can be produced in known manner by an intense mechanical treatment, for example, on a roller mill or in a suitable kneading apparatus.

By virtue of their chemical inertness and good heat resistance, the pigments can easily be dispersed in the usual manner in the aforesaid masses and preparations, and this is advantageously carried out at a stage before the said masses and preparations have reached their final form. The operation required for giving the products their final form, as, for example, spinning, pressing, hardening, casting and cementing can easily be carried out in the presence of the pigments without interfering with any chemical reactions of the substratum, such as further polymerisation, condensation or polyaddition.

The colorations obtained with the pigments of this invention are distinguished by their excellent fastness to light, weathering, migration and overstripe bleeding as well as excellent heat stability, color strength and dispersiblity.

The preferable high molecular organic materials are polyvinylchloride, polyurethane, low and high density polyethylene, polypropylene, automobiles finishing lacquers such as systems based on alkyd-melamine and thermosetting and thermoplastic acrylic resin lacquers.

The pigment may be used in a concentration of 0.001 to 10% by weight based on the weight of the high molecular organic material to be pigmented and preferably in the range of from 0.01 to 5% by weight.

In the examples which follow the parts, unless otherwise stated, denote parts by weight and the percentages denote percentages by weight.

EXAMPLE 1

18.6 parts of the dyestuff obtained by coupling diazotised 2-nitro-5-chloro-1-amino-benzene with 2,3-hydroxynaphthoic acid, in 50 parts by volume of chlorobenzene, are warmed with 7.2 parts by volume of thionyl chloride to 135° C for 20 minutes. In the course thereof, the dyestuff dissolves. The mixture is allowed to cool and the crystalline dyestuff-carboxylic acid chloride which has precipitated is isolated by filtration. After drying, 17 parts of the chloride are obtained.

2.34 parts of this chloride in 150 parts by volume of o-dichlorobenzene are warmed with 0.475 part of 1,5-diamino-naphthalene to 135° C for 12 hours. Thereafter the pigment formed is filtered off hot and washed with hot o-dichlorobenzene and then with dimethylformamide, methanol and water. After drying, 2.4 parts of the pigment of the formula

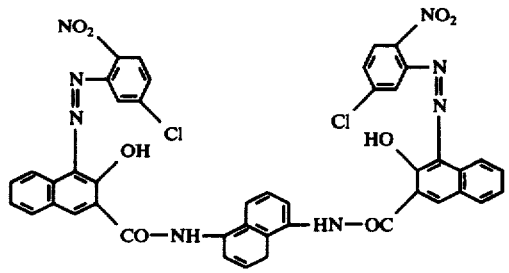

are obtained. The pigment dyes polyvinyl chloride in a yellow-brown shade of very good fastness to migration and to light.

EXAMPLES 2 - 10

The table which follows contains further examples of pigments which are obtained if the dyestuff-carboxylic acid chloride used in Example 1 is condensed with the diamines listed in column I, in the manner indicated in Example 1, in the molar ratio of 2:1, and column II indicates the shades obtained in polyvinyl chloride.

| Ex. No. | I | II |
|---|---|---|
| 2 | 1,4-Diamino-benzene | reddish brown |
| 3 | 2-Chloro-1,4-diamino-benzene | brown |
| 4 | 2,5-Dichloro-1,4-diamino-benzene | brown-orange |
| 5 | 2-Methylsulphonyl-1,4-diamino-benzene | red |

| Ex. No. | I | II |
|---|---|---|
| 6 | 2,5-Diethoxy-1,4-diamino-benzene | yellow-brown |
| 7 | 2-Methoxy-1,4-diamino-benzene | yellow-brown |
| 8 | 2-Methyl-5-chloro-1,4-diamino-benzene | brown |
| 9 | 2,5-Dimethyl-1,4-diamino-benzene | brown |
| 10 | 1,4-Diamino-benzene-2,5-dicarboxylic acid dimethyl ester | red-brown |
| 11 | 2-Methyl-1,4-diamino-benzene | brown |
| 12 | 2,5-Dimethoxy-1,4-diamino-benzene | yellow-brown |
| 13 | 2-Methyl-5-methoxy-1,4-diaminobenzene | yellow-brown |

EXAMPLE 14

19.5 parts of the dyestuff obtained by coupling diazotised 1-nitro-2-amino-naphthalene with 2,3-hydroxynaphthoic acid, in 150 parts by volume of chlorobenzene, are warmed with 7.2 parts by volume of thionyl chloride to 135° C over the course of 30 minutes. In the course thereof, the dyestuff dissolves. The mixture is allowed to cool and the dyestuff-carboxylic acid chloride which precipitates in a crystalline form is isolated by filtration. On drying, 18.3 parts of the chloride are obtained.

3.65 parts of this chloride in 150 parts by volume of o-dichlorobenzene are warmed with 0.485 part of 1,4-diaminobenzene and 1.3 parts by volume of triethylamine to 135° C over the course of 12 hours. Thereafter the pigment formed is filtered off hot and washed with hot o-dichlorobenzene and then with dimethylformamide, methanol and water. After drying, 3.5 parts of the pigment of the formula

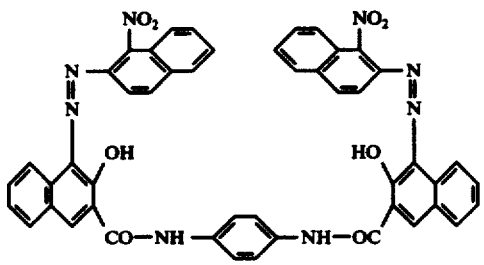

are obtained. The pigment dyes polyvinyl chloride in a red-violet shade of very good fastness to migration and to light.

EXAMPLES 15 - 19

If instead of 1,4-diaminobenzene the compounds mentioned below in column I are used and otherwise the procedure indicated in Example 14 is followed, pigments having the shade mentioned in Column II are obtained.

| Example No. | I | II |
|---|---|---|
| 15 | 2-Methoxy-1,4-diaminobenzene | claret |
| 16 | 2,5-Dimethyl-1,4-diaminobenzene | claret |
| 17 | 2-Methyl-5-methoxy-1,4-diaminobenzene | claret |
| 18 | 2-Chloro-5-methoxy-1,4-diaminobenzene | claret |
| 19 | 1,5-Diamino-naphthalene | claret |

EXAMPLE 20

65 parts of stabilised polyvinyl chloride, 35 parts of dioctyl phthalate and 0.2 part of the dyestuff obtained according to Example 1 are stirred together and then milled on a two-roll calender for 7 minutes at 140° C. A film coloured yellow-brown, of very good fastness to light and to migration, is obtained.

EXAMPLE 21

40 parts of a nitrocellulose lacquer, 2,375 parts of titanium dioxide and 0.125 part of the compound of Example 5 are ground together in a rod mill for 16 hours. The lacquer so obtained is brushed in a thin layer on an aluminum foil. There is obtained a red lacquer coating having very good properties of fastness.

EXAMPLE 22

0.25 parts of the compound of Example 1 are ground in a rod mill for 24 hours with 40 parts of an alkyd-melamine bakeable lacquer having a solids content of 50%, and 4.75 parts of titanium dioxide. The lacquer so obtained is branched in a thin layer on an aluminum foil and the coating is baked for 1 hour at 120° C. There is obtained a yellow brown lacquer coating having an excellent fastness to light.

EXAMPLE 23

1 part of the pigment described in Example 1 is mixed with 99 parts of high-pressure polyethylene and this mixture is then rolled to and fro on a roller mill for 10 minutes at 140° to 170° C. There is obtained a yellow brown foil possessing excellent fastness to light, migration and heat. The foil can be granulated and the granules so obtained can be used in injection moulding or in foil blowing.

EXAMPLE 24

99.51 parts of isotactic polypropylene in the form of chips are "Bread-crumbed" in the dry state with 0.5 part of the dry dyestuff described in Example 2. The chips, coated with dry dyestuff powder, are then melted at 180° to 220° C and expressed through a nozzle. There is obtained a strip of reddish brown colored polypropylene that, after cooling, can be granulated. The granules so obtained can be used in injection moulding.

EXAMPLE 25

99 parts of polyethylene terephthalate chips are bread-crumbed in dry state with the pigment used in Example 3 and spun from the melt in the usual manner at about 275° C. There is obtained a brown colored polyester filament whose coloration exhibits good fastness properties.

EXAMPLE 26

20 parts of a medium viscous polyester from adipic acid and glycols, containing hydroxyl groups, known by the trade name "Desmophen 2200" into which 1 part of the pigment of Example 4 has been rubbed, and 6.5 parts of a mixture of toluene-2,4-diisocyanate and toluene-2,6-diisocyanate are mixed with 1 part of toluolic solution of 10% strength of 4-amino-azobenzene.

The following are then stirred in: 1.9 parts of a mixture of 1 part of distilled water, 1.5 parts of a polyglycol ether, and 3 parts of a basic catalyst, for example ethylmorpholine.

Reaction sets in spontaneously and yields a brown orange foamed polyurethane product.

EXAMPLE 27

A mixture of 1 part of the pigment of Example 6 is added to a solution at 100° C of 165 parts of polyacrylonitrile in 834 parts of dimethylformamide. The mass is spun from a spinning machine into a precipitating bath of water at 90° C. The yellow brown filaments have good fastness properties.

EXAMPLE 28

A mixture of 1 part of the pigment of Example 7 and 199 parts of a copolymer of 60.1% of vinyl chloride and 39.9% of acrylonitrile, and 800 parts of acetone is stirred for 4 hours at 50° C. The pigmented solution is spun into a precipitating bath of water. The yellow brown filaments are then orientated and heat-set in boiling water. They possess very good fastness properties.

EXAMPLE 29

1 part of the powdered pigment of Example 9 is agitated in the cold with 100 parts of a powdered copolymer from 15 parts of vinyl chloride and 85 parts of vinylidene chloride so as to form a homogenous pulverulent mixture. 30 parts of tricresylic phosphate are added to the mixture which is then passed into a calander, the rollers of which are heated to 150° C, and finally pressed at 170° C, cooled and taken out of the press. A brown-colored foil is obtained.

EXAMPLE 30

2 parts of the powdered pigment of Example 12 are mixed with 7 parts of a copolymer from 85 parts of vinylchloride and 15 parts of vinylacetate and 5 parts of a ketone resin obtained by self-condensation of cyclohexanone and stirred with a mixture consisting of 43 parts of methyl ethyl ketone and 13 parts of toluene. The so-obtained printing color gives when printed in a photogravure rotary machine on paper yellow brown prints having excellent fastness properties.

EXAMPLE 31

100 parts of cellulose filler and 0.5 part of the pigment of Example 13 are added to 100 parts of phenol-formaldehyde resin in powder form. The mixture is ground in a roller mill for rubber heated to 120° C until homogenous. The sheets obtained are then crushed and ground in a disc mill. A moulding powder is thus obtained yielding objects of yellow brown color when heated under pressure.

EXAMPLE 32

300 parts of a polycarbonate powder which was obtained by polycondensation of the pigment in Example 14 with phosgene in aqueous sodium hydroxide is homogenously mixed with 10 parts of 4,4'-diamino-1,1'-dianthraquinonyl and used for molding at 220° C. There are obtained red violet articles having excellent fastness properties.

EXAMPLE 33

100 parts of a 40 percent solution of methyl methacrylate in butylacetate are ground with 10 parts of the pigment of Example 1. The so-obtained coating composition is suitable as a screening lacquer-enamel.

EXAMPLE 34

A solution of 20 parts of a polyamide resin obtained by condensation of di- and trimerized unsaturated fatty acids, predominantly linolic acid with polyamides (Versamid 930) in 40 parts of isopropanol and 40 parts n-heptane was ground with 5 parts of the pigment of Example 19. The so-obtained printing ink is suitable for intaglio printing on paper, aluminum, cellophane and polyethylene.

EXAMPLE 35

70 parts of a 30 percent solution of a copolymer of esters of acrylic acid and methacrylic acid in a toluene butanol mixture are mixed with 9 parts of butyl benzylphthalate as plasticizer, 7 parts of ethyl ethylene glycol acetate, 7 parts of methyl ethyl ketone and 7 parts of toluene. The mixture is ground with 5 parts of the pigment of Example 1 and 10 parts of titanium dioxide. The so-obtained lacquer gives very fast coatings when sprayed on metals, dried and cured for 1 hour at 80° C.

What is claimed is:

1. A compound of the formula

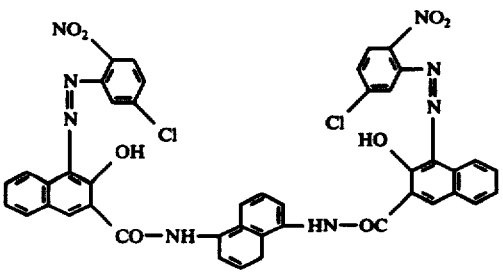

* * * * *